US008287782B2

(12) United States Patent
Yao et al.

(10) Patent No.: US 8,287,782 B2
(45) Date of Patent: Oct. 16, 2012

(54) INTERFERENCE FITTING POLAR RESIN OPHTHALMIC LENS MOLDING DEVICES AND RELATED METHODS

(75) Inventors: Li Yao, Pleasanton, CA (US); J. Christopher Marmo, Danville, CA (US); Xuxian Niu, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 1010 days.

(21) Appl. No.: 11/834,283

(22) Filed: Aug. 6, 2007

(65) Prior Publication Data

US 2008/0054505 A1 Mar. 6, 2008

Related U.S. Application Data

(60) Provisional application No. 60/836,545, filed on Aug. 8, 2006.

(51) Int. Cl.
*B29D 11/00* (2006.01)
(52) U.S. Cl. ........ 264/2.6; 264/1.1; 264/1.36; 264/1.38; 264/2.5; 264/2.7
(58) Field of Classification Search .................. 264/1.1, 264/1.32, 2.6, 1.36, 1.38, 2.5, 2.7; 425/470, 425/808
See application file for complete search history.

(56) References Cited

U.S. PATENT DOCUMENTS

| 4,121,896 | A | * | 10/1978 | Shepherd | ....................... | 425/412 |
|---|---|---|---|---|---|---|
| 4,208,364 | A | | 6/1980 | Shepherd | | |
| 4,565,348 | A | | 1/1986 | Larsen | | |
| 5,087,015 | A | | 2/1992 | Galley | | |
| 5,352,714 | A | | 10/1994 | Lai et al. | | |
| 6,310,116 | B1 | * | 10/2001 | Yasuda et al. | ................. | 523/106 |
| 6,416,690 | B1 | | 7/2002 | Soane et al. | | |
| 6,821,108 | B2 | | 11/2004 | Hagmann et al. | | |
| 6,827,325 | B2 | | 12/2004 | Hofmann et al. | | |
| 6,867,245 | B2 | | 3/2005 | Iwata et al. | | |
| 7,320,587 | B2 | | 1/2008 | Goodenough et al. | | |
| 2005/0100631 | A1 | * | 5/2005 | Baba et al. | ..................... | 425/808 |
| 2005/0228094 | A1 | * | 10/2005 | Bunnelle | ....................... | 524/423 |
| 2006/0188487 | A1 | * | 8/2006 | Thomas et al. | ............. | 424/93.7 |

OTHER PUBLICATIONS

PCT International Search Report completed Jan. 24, 2008 and mailed Mar. 12, 2008 from corresponding PCT Application No. PCT/US07/75349 filed Aug. 7, 2007 (2 pages).
PCT Written Opinion of the International Searching Authority completed Nov. 26, 2007 and mailed Mar. 12, 2008 from corresponding PCT Application No. PCT/US07/75349 filed Aug. 7, 2007 (6 pages).
Office Action dated Sep. 9, 2010 from corresponding Taiwanese Application No. 096129238 (6 pages).
English translation of Office Action dated Sep. 9, 2010 from corresponding Taiwanese Application No. 096129238 (4 pages).

* cited by examiner

*Primary Examiner* — Joseph Del Sole
*Assistant Examiner* — Timothy Kennedy
(74) *Attorney, Agent, or Firm* — Klein, O'Neill & Singh, LLP

(57) ABSTRACT

Ophthalmic lens molds include first and second mold members sized and adapted to be assembled, for example interference fitted, together to define a lens-shaped cavity therebetween. At least one of the mold members includes a polar polymeric material and has a flexural modulus less than 3800 MPa.

25 Claims, 2 Drawing Sheets

INTERFERENCE FITTING POLAR RESIN OPHTHALMIC LENS MOLDING DEVICES AND RELATED METHODS

The present invention relates to ophthalmic lens molding devices and related methods. More particularly, the invention relates to polar resin molds and mold members which have a flexibility or a flexural modulus effective in permitting two mold members to be coupled together by an interference fit in the form of a lens mold, and methods of using such mold members or molds in the production of ophthalmic lenses, such as silicone hydrogel contact lenses.

CROSS-REFERENCE TO RELATED APPLICATION

This is an ordinary application of Provisional Application Ser. No. 60/836,545, filed Aug. 8, 2006, the contents of which are expressly incorporated herein by reference.

BACKGROUND

In cast molding methods of producing ophthalmic lenses, such as contact lenses, a reaction mixture or polymerizable lens precursor composition is cured in a lens shaped cavity defined by a first mold member and a second mold member, or a female and male mold member, respectively. The mold members are typically produced by injection molding a thermoplastic material into mold shaped cavities. Examples of thermoplastic materials include non-polar resins, such as polypropylene, polystyrene, and polyethylene; and polar resins, such as ethylene-vinyl alcohol polymeric resins, and polyvinyl alcohol polymeric resins. The first and second mold members are placed or coupled together to form the lens shaped cavity.

One type of coupling of the first mold member and second mold member utilizes an interference fit between the first and second mold members. For example, the second mold member may be held in place relative to the first mold member by a pressure fit provided by a portion of the first mold member acting on a portion of the second mold member. An interference fit can be understood to be a fastening between first and second mold members that is achieved by friction between a portion of the first mold member and a portion of the second mold members after the mold members are pushed or pressed together.

Another type of coupling is referred to as a point contact coupling. With point contact mold members, the first and second mold members are placed in contact with each other, and require an additional coupling mechanism to hold the two mold members together. For example, two point contact mold members can be held together by physically clamping the mold members together using an additional device. Or, two point contact mold members can be held together by fusing a portion of the two mold members together.

The type of coupling used to form the contact lens molds often relates to the type of material used to produce the mold members. For example, more elastic or flexible polymeric materials, such as relatively non-polar or hydrophobic polymeric resins, may be used to form interference fit mold members. In comparison, more rigid or inflexible polymeric materials, such as relatively polar or hydrophilic polymeric materials, may be used to form point contact mold members.

When polypropylene or polystyrene contact lens molds, which are suitable for interference fit coupling, described above, are used to produce silicone hydrogel contact lenses, it is known that the silicone hydrogel contact lenses so produced require surface treatments or an interpenetrating polymer network (IPN) of a polymeric wetting agent in order to make the lenses ophthalmically acceptable or have ophthalmically acceptable surface wettabilities.

Contact lens molds that are made from SOARLITE™ S (a polar resin of ethylene-vinyl alcohol (EVOH) copolymers available from Nippon Gohsei, Ltd.) are effective in producing silicone hydrogel contact lenses having ophthalmically acceptable wettabilities without requiring a surface treatment or an IPN of a polymeric wetting agent to provide the wettability of the silicone hydrogel contact lenses. Due to the rigidity of SOARLITE™ S, the first and second mold members are coupled together using the point contact coupling described above, as opposed to an interference fit coupling.

In view of the above, it can be appreciated that a need exists for new lens molding devices and methods that do not require contact point coupling for the manufacture of ophthalmic lenses, such as silicone hydrogel contact lenses, that are ophthalmically compatible without requiring a surface treatment or a polymeric wetting agent IPN. An existing problem relates to producing ophthalmically acceptable ophthalmic lenses, such as silicone hydrogel contact lenses, without requiring a surface treatment or a polymeric wetting agent IPN, and without requiring a contact point coupling method for contact lens molds used in the production of the lenses.

All publications, including patents, published patent applications, scientific or trade publications and the like, cited in this specification are hereby incorporated herein in their entirety.

SUMMARY

New polar ophthalmic lens molds and mold members have been discovered. The present molds and mold members provide substantial benefits compared to prior art polar molds and mold members. For example, ophthalmic lenses, such as silicone hydrogel lenses, obtained from the present molds and mold members have ophthalmically acceptable surface wettabilities. In addition, the present molds and mold members have one or more properties which facilitate the more efficient/effective manufacture of ophthalmic lenses, for example, on a commercial or mass scale, relative to prior art polar molds and mold members.

In one broad aspect of the present invention, ophthalmic lens molds are provided comprising a first mold member and a second mold member sized and adapted to be assembled together to define a lens-shaped cavity therebetween. At least one, or both, of the first mold member and the second mold member comprises a polar polymeric material and has a flexural modulus less than 3800 MPa. In certain embodiments, one or more of the present mold members comprises a polar polymeric material having a flexural modulus less than about 3000 MPa, or less than about 2000 MPa, or less than about 1000 MPa. In certain embodiments, the present mold members comprise a polar polymeric material having a flexural modulus from about 500 MPa to about 900 MPa, such as about 770 MPa, or a flexural modulus from about 1500 MPa to about 1900 MPa, such as about 1710 MPa. The flexural modulus values described herein can be determined using the ISO 178 method.

In another broad aspect of the invention, mold members for use in producing ophthalmic lenses are provided. Such mold members comprise a mold member body having a surface useful in forming an anterior or posterior face or surface of an ophthalmic lens. The mold member body is sized and adapted to be assembled together with another mold member body to define a cavity, such as a lens-shaped cavity, including the surface therebetween. The mold member body comprises a polar polymeric material, and has a flexural modulus less than 3800 MPa, including the specific values described above.

In a further broad aspect of the invention, ophthalmic lens molds are provided which comprise a first mold member and a second mold member sized and structured to be interference fitted together, such as press fit together, to define a lens-shaped cavity therebetween. At least one, and preferably both, of the first and second mold members comprise a polar polymeric material.

Any and all features described herein and combinations of such features are included within the scope of the present invention provided that the features of any such combination are not mutually inconsistent. In addition, any feature or combination of features may be specifically excluded from any embodiment of the present invention.

These and other aspects and advantages of the present invention are apparent in the following detailed description, Examples, drawing and additional disclosure in claim format.

DETAILED DESCRIPTION

Figure 1:
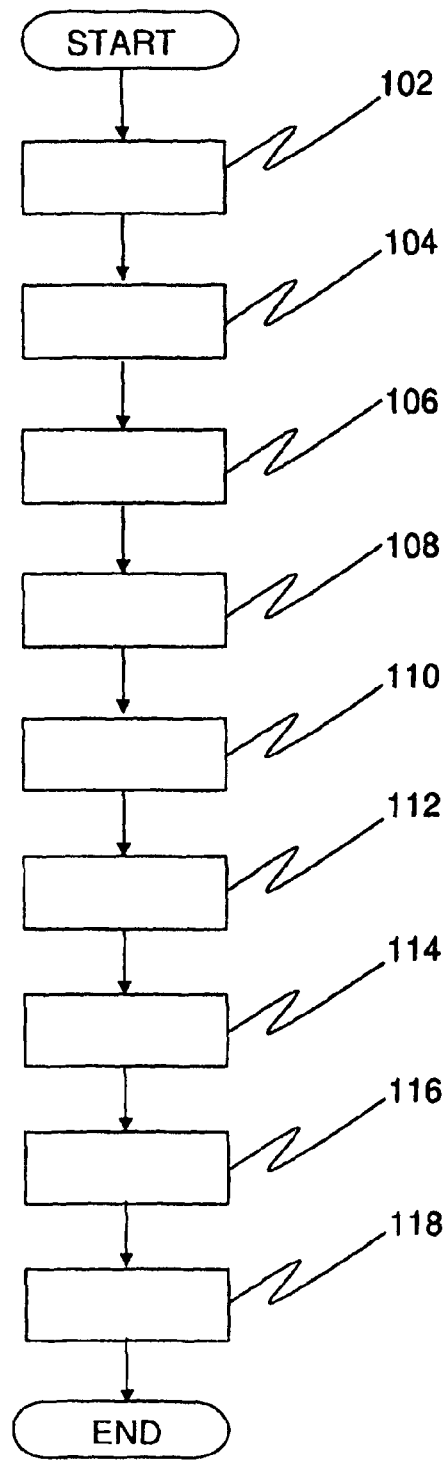
FIG. 1 is a flow chart illustrating steps of a method for producing a silicone hydrogel contact lens.

Ophthalmic lens molds or ophthalmic lens mold members made from EVOH under the tradename of SOARLITE™ S, as described herein, can be used to produce ophthalmically compatible silicone hydrogel contact lenses without requiring a surface treatment or a polymeric wetting agent IPN. Ophthalmic lens molds made of SOARLITE™ S have a flexural modulus of 3800 MPa, as determined using the ISO 178 method, and a tensile modulus of 1170 MPa, as determined using the ISO 527-2 method. These SOARLITE™ S ophthalmic lens mold members are relatively rigid and cannot be coupled together using an interference fit to form an ophthalmic lens mold without damaging at least a portion of one or both of the ophthalmic lens mold members. Nylon based molds are also relatively rigid and are not suitable for interference fitting.

The present invention provides new polar ophthalmic lens molding devices, such as lens molds and lens mold members, and methods of using such molding devices for producing ophthalmic lenses, such as silicone hydrogel contact lenses. The present polar molds and polar mold members are effective in providing ophthalmically acceptable surface wettabilities to lenses, such as silicone hydrogel contact lenses, produced using such molds and mold members. Such surface wettabilities are achieved without surface treating the lenses and without using interpenetrating polymer networks (IPNs) of polymeric wetting agents in the lenses.

Moreover, the present polar molds and mold members are such as to enhance lens manufacturing relative to lens manufacturing using contact point-coupled polar molds and mold members. The present molds and mold members have reduced flexural moduli relative to SOARLITE™ S molds and mold members. The present molds and mold members can be structured to be interference fitted together for use in producing ophthalmic lenses. These features allow the molds and mold members to be assembled together, for example, prior to formation of the lens, and to be disassembled or demolded, for example, after formation of the lens. The ease of assembly/disassembly of the molds greatly facilitates manufacture of consistent, high quality ophthalmic lenses, for example, contact lenses.

In one aspect, the present ophthalmic lens molds comprise a first mold member and a second mold member sized and adapted to be assembled together to define a lens-shaped cavity therebetween. At least one of the first mold member and the second mold member comprises a polar polymeric material and has a flexural modulus less than 3800 MPa, such as a flexural modulus less than 3800 MPa as determined using the ISO 178 method, as understood by persons of ordinary skill in the art. Providing first and/or second mold members comprising a polar polymeric material, for example, a major amount, that is at least about 50% by weight of polar polymeric material, with a flexural modulus of less than 3800 MPa has been found to allow the first and second mold members to be structured to be interference fitted together for assembly in producing ophthalmic lenses, e.g., contact lenses.

In one embodiment, at least one, including both, of the first and second mold members comprise a polar polymeric material and have a flexural modulus of less than about 3000 MPa. The polar polymeric material may be present in the first and/or second mold members in an amount effective to provide an increased surface wettability of a given silicone hydrogel contact lens produced using the first and/or second mold members relative to an identical given silicone hydrogel contact lens produced using identical first and second mold members made of a non-polar polymeric material, such as polypropylene. The first and/or second mold members may include at least about 40% or at least about 50% or at least about 60% or at least about 70% or at least about 80% or more by weight of a polar polymeric material.

In certain embodiments, the present mold members have a flexural modulus from about 3000 MPa to 3799 MPa. For example, a mold member may have a flexural modulus of 3100 MPa, 3200 MPa, 3300 MPa, 3400 MPa, 3500 MPa, 3600 MPa, or 3700 MPa. In additional embodiments, the present mold members may have a flexural modulus less than 3000 MPa. For example, a mold member may have a flexural modulus of about 2800 MPa, about 2500 MPa, about 2200 MPa, or about 2000 MPa. In additional embodiments, the present mold members may have a flexural modulus less than 2000 MPa, such as about 1900 MPa, about 1800 MPa, about 1700 MPa, about 1600 MPa, about 1500 MPa, about 1200 MPa, or about 1000 MPa. In some embodiments, the present mold members have a flexural modulus less than 1000 MPa, such as about 900 MPa, about 800 MPa, about 700 MPa, about 600 MPa, about 500 MPa, or about 200 MPa. In certain embodiments, the present mold members have a flexural modulus from about 1500 MPa to about 1900 MPa, for example, one embodiment of the present mold members and molds have a flexural modulus of 1710 MPa. In certain embodiments, the present mold members have a flexural modulus from about 500 MPa to about 900 MPa, for example, one embodiment of the present mold members and molds have a flexural modulus of 770 MPa. As discussed herein, the above-identified flexural modulus values can be determined using the ISO 178 method, as understood by persons of ordinary skill in the art.

The polar polymeric material may include any suitable polar group or groups. Of course the polar polymeric material should be suitable to be formed, for example, injection molded and the like, into ophthalmic lens mold members useful for the production of ophthalmic lenses, for example, contact lenses, intraocular lenses, corneal inlays, corneal onlays and the like. Examples of such polar groups include, without limitation, hydroxyl groups (—OH), carboxy groups (—COOH), amino groups (—NH, —NH$_2$), amide groups (—CONH$_2$, —(RCO)$_2$NH, —(RCO)$_3$N), and nitro groups (—NO$_2$).

Examples of polar polymeric materials useful in the present first and/or second mold members include, without limitation, ethylene vinyl alcohol polymers (EVOH), poly vinyl alcohol (PVOH), nylon, ethylene vinyl acetate, polynitrile, copolymers thereof, and combinations thereof.

In one embodiment, the polar polymeric material is included in the present first and/or second mold members in an amount effective to produce an ophthalmically compatible silicone hydrogel contact lens.

As used herein, an "ophthalmically compatible silicone hydrogel contact lens" refers to a silicone hydrogel contact lens that can be worn on a person's eye without the person experiencing or reporting substantial discomfort, including ocular irritation and the like. Such lenses often have an oxygen permeability, a surface wettability, a modulus, a water content, ionoflux, a design, and combinations thereof which permit the present lenses to be comfortably worn on a patient's eye for extended periods of time, such as for at least a day, at least a week, at least two weeks, or about a month without requiring removal of the lens from the eye. Ophthalmically compatible silicone hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort. A silicone hydrogel contact lens having an ophthalmically acceptable surface wettability can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye. Ophthalmically compatible silicone hydrogel contact lenses meet clinical acceptability requirements for daily wear or extended wear contact lenses.

Such silicone hydrogel contact lenses comprise lens bodies that have surfaces, such as an anterior surface and a posterior surface, with ophthalmically acceptable wettabilities. Wettability refers to the hydrophilicity of one or more surfaces of a contact lens. As used herein, a surface of a lens can be considered wettable, or have an ophthalmically acceptable wettability, if the lens receives a score of 3 or above in a wettability assay conducted as follows. A contact lens is dipped into distilled water, removed from the water, and the length of time that it takes for the water film to recede from the lens surface is determined (e.g., water break up time (water BUT)). The assay grades lenses on a linear scale of 1-10, where a score of 10 refers to a lens in which a drop takes 20 seconds or more to fall from the lens. A silicone hydrogel contact lens having a water BUT of more than 5 seconds, such as at least 10 seconds or more desirably at least about 15 seconds, can be a silicone hydrogel contact lens having an ophthalmically acceptable surface wettability. Wettability can also be determined by measuring a contact angle on one or both lens surfaces. The contact angle can be a dynamic or static contact angle. Lower contact angles generally refer to increased wettability of a contact lens surface. For example, a wettable surface of a silicone hydrogel contact lens can have a contact angle less than about 120 degrees. However, in certain embodiments of the present lenses, the lenses have a contact angle no greater than 90 degrees, and in further embodiments, the present silicone hydrogel contact lenses have advancing contact angles less than about 80 degrees.

The silicone hydrogel contact lenses produced using the present first and/or second mold members advantageously have ophthalmically acceptable surface wettabilities and do not require a surface treatment or a polymeric wetting agent IPN to provide the surface wettability.

In contrast, many silicone hydrogel contact lenses produced using mold members made predominantly or even exclusively from non-polar resins or hydrophobic resins do not have ophthalmically acceptable surface wettabilities without surface treatments or the inclusion of a polymeric wetting agent (IPN) to provide the surface wettability.

As used herein, a "non-polar resin contact lens mold" or "hydrophobic resin contact lens mold" refers to a contact lens mold that is formed or produced from a non-polar or hydrophobic resin. Thus, a non-polar resin based contact lens mold can comprise a non-polar or hydrophobic resin. For example, such contact lens molds can comprise one or more polyolefins, or can be formed from a polyolefin resin material. Examples of non-polar resin contact lens molds used in the context of the present application include polyethylene contact lens molds, polypropylene contact lens molds, and polystyrene contact lens molds. Non-polar resin based contact lens molds typically have hydrophobic surfaces. For example, a non-polar resin mold or a hydrophobic resin mold may have a static contact angle of about 90 degrees or more, as determined using the captive bubble method. With such contact angles, conventional silicone hydrogel contact lenses produced in such molds have clinically unacceptable surface wettabilities.

Contact angles measured using the captive bubble method can be performed in purified water using a contact angle tester, such as Model CA-DT manufactured by Kyowa Kaimen Kagaku Co., Ltd. or a Kruss DSA 100 instrument (Kruss GmbH, Hamburg). The measurements can be performed at 25° C.

In one embodiment, the flexural modulus of the first and/or second mold members can be reduced by including a plasticizer component in the first and/or second mold members. Thus, the at least one of the first mold member and the second mold member comprising the polar polymeric material may further include a plasticizer component in an amount effective to reduce the flexural modulus of the at least one of the first and second mold member relative to an identical at least one of the first and second mold member without the plasticizer component.

Any suitable plasticizer component may be employed in accordance with the present invention. Such plasticizer component should be such as to provide the first and/or second mold members with the desired reduced flexural modulus without unduly or significantly adversely affecting the usefulness of the mold member or members to produce the desired ophthalmic lens and/or the method of manufacturing the ophthalmic lens. Moreover, the plasticizer component is advantageously useful without unduly or significantly adversely affecting the quality of the lens produced.

Examples of useful plasticizer components include, without limitation, abietic derivatives, acetic acid derivatives, adipic acid derivatives, azelaic acid derivatives, benzoic acid derivatives, butane derivatives, polyphenyl derivatives, citric acid derivatives, dodecanedioates, epoxy derivatives, formal materials, fumaric acid derivatives, glutaric acid derivatives, glycerol derivatives, glycol derivatives, petroleum derivatives, isobutyric acid derivatives, isophthalic acid derivatives, lactams (such as 2-pyrrolidone and the like), lauric acid derivatives, paraffin derivatives, petargonic acid derivatives, pentaerythritol derivatives, phenoxy plasticizers, phosphoric acid derivatives, phthalic acid derivatives, polyesters, polyol esters, ricinoleic acid derivatives, sebacic aid derivatives, stearic acid derivatives, styrene derivatives, sucrose derivatives, sulfonic acid derivatives, tall oil derivatives, terephthalic acid derivatives, trimellitates, and the like and mixtures thereof. In certain embodiments of the present molding devices, water soluble plasticizers are included the molding material.

The amount of plasticizer component employed can vary widely depending, for example, on the specific plasticizer component employed, the degree of flexural modulus reduction desired, the specific polar polymeric material being employed, the other components and amounts thereof, if any, present in the first and/or mold members and the like factors. For example, the plasticizer component may be present in the composition used to form the present first and/or second mold members, or in the present first and/or second mold members) in a range of about 0.01% or about 0.05% or about 0.1% to about 1% or about 5% or about 10% or about 20% or about 30% by weight of the composition or the first and/or second mold members. In certain embodiments described herein, the plasticizers are present in an amount less than about 25% w/w. For example, embodiments of the present devices may have a plasticizer or plasticizers, including water soluble plasticizers, in an amount from about 10% to about 15% w/w.

In one useful embodiment, the present molds are effective to produce, from a polymerizable lens precursor composition located in the lens shaped cavity, an ophthalmic lens having at least one of (1) increased surface wettability and (2) increased water breakup time relative to an ophthalmic lens produced from an identical polymerizable lens precursor composition and an identical mold including polypropylene instead of the polar polymeric material. In an embodiment of the present invention, the mold includes a first mold member and a second mold member structured to produce an ophthalmic lens having at least a rounded posterior edge portion.

The first mold member and the second mold member advantageously are structured to be easily separated after being assembled together, preferably without causing substantial damage to at least one of the first and second mold members, and to an ophthalmic lens product produced in the lens shaped cavity.

The present molds may include a first mold member and/or a second mold member which comprises a mixture of the polar polymeric material and a different hydrophobic polymeric material. Such mixtures may be useful in reducing the flexural modulus of the mold member including the mixture of polar and hydrophobic polymeric materials relative to the flexural modulus of an identical mold member or members including only the polar polymeric material.

In one useful embodiment, the polar polymeric material comprises ethylene vinyl alcohol (EVOH). The EVOH employed in accordance with the present invention may have an increased equivalent ethylene content relative to SOARLITE S ethylene vinyl alcohol. For example, SOARLITE S has an ethylene content of 38 mol %. Thus, embodiments of the present mold sections may comprise EVOH having an ethylene content greater than 38 mol %. In certain embodiments, the ethylene content is greater than 40 mol %. In more specific embodiments, the ethylene content is about 45 mol %, for example 44 mol %.

The use of EVOH materials having increased equivalent ethylene contents reduces the flexural modulus of the mold member or members. However, care should be exercised to avoid reducing the polar group density of the EVOH material since it is believed that reduced polar group density may tend to reduce one or more benefits, such as providing increased surface wettability, increased water break up time and/or one or more other benefits, for example, as discussed elsewhere herein, of producing ophthalmic lenses using mold members including polar polymeric materials.

One measure of the ability of a mold member including a polar polymeric material to provide benefits, such as silicone hydrogel contact lenses having ophthalmically acceptable surface wettabilities, is the contact angle of the mold member. In one embodiment, at least one, and preferably both, of the first and second mold members has a flexural modulus of less than 3800 MPa, and a contact angle of less than 90°, preferably less than 68°, with the contact angle being measured using the captive bubble method.

In one embodiment, the polar polymeric material comprises a hydrophilic polymer. The polar polymeric material may comprise a mixture including one or more polar polymers and one or more non-polar polymers, such as non-hydrophilic polymers or hydrophobic polymers. Useful non-polar polymers include polymers which are less polar than the polar polymers included in the mold member or members. In one embodiment, the non-polar polymer employed is at least about 10% or at least about 30% or at least about 50% or at least about 70% or at least about 90% less polar than the polar polymer included in the mold member or members. Polymer polarity can be determined using one or more standard tests or assays which are conventional and well known in the polymer art. In one embodiment, the non-polar polymer has substantially no polarity. The non-polar polymer or polymers should be selected to be compatible with the polar polymer or polymers so as to provide a suitable polymer mixture for use in ophthalmic lens molds and mold members in accordance with the present invention.

Examples of the non-polar polymers that may be employed in combination with polar polymers in accordance with the invention include, without limitation, polyolefins, preferably selected from polyethylene, polypropylene, polystyrene, and the like and mixtures thereof.

In one embodiment, the polar polymeric material may comprise a mixture of EVOH and a non-polar polymer, such as, without limitation, a polyolefin, preferably selected from polyethylene, polypropylene, polystyrene, and the like and mixtures thereof.

In another useful embodiment, the polar polymeric material comprises polyvinyl alcohol (PVOH).

In one useful embodiment, the polar polymeric material comprises a mixture of PVOH and a non-polar polymer. The non-polar polymer may be, without limitation, a polyolefin, preferably selected from polyethylene, polypropylene, polystyrene, and the like and mixtures thereof. The use of mixtures of polar polymers and non-polar polymers is effective to reduce the flexural modulus of a mold member. However, again, consideration must be given to maintaining a sufficient polar group density, for example, as measured by contact angle, to achieve the one or more desirable results of the use of mold members including polar polymeric materials in producing ophthalmic lenses.

The relative amounts of the polar polymer(s) and non-polar polymer(s) in the present molds and mold members may vary widely and depend on various factors, such as the specific polar polymer(s) employed, the specific non-polar polymer(s) employed, the specific lens material to be employed, the specific lens (mold) design to be obtained and the like factors. In one embodiment, the non-polar polymer(s) comprise a minor amount, that is less than about 50%, by weight of the mixture of polar polymer(s) and non-polar polymer(s). The non-polar polymer(s) may comprise at least about 5% or about 10% or about 15% or about 20% by weight of the mixture of polar polymer(s) and non-polar polymers(s).

The present first and second mold members are advantageously structured to be interference fitted together to define a lens shaped cavity therebetween. Using such interference fitted mold members allows the mold to be easily, quickly and securely joined or assembled together so that a lens with desired optical and physical properties can be produced in the lens-shaped cavity. This is in contrast to molds including mold members which cannot be interference fitted together, for example, because the mold member or members are too rigid, such as mold members having a flexural modulus of at least 3800 MPa. Such rigid mold members must be secured together in ways other than interference fitting, for example, by selective melting, to form a "single piece" mold from first and second molds. Not only does forming a useable "single piece" mold require additional processing to produce, it also is difficult to disassemble (break) or open to retrieve the lens formed in the lens-shaped cavity. In contrast, the present interference fitted mold members are both easy to assemble and easy to disassemble or open using automated machinery or equipment after the lens is formed in the lens-shaped cavity. This easy mold assembly/disassembly feature of the present invention can enhance the ease and cost effectiveness of producing ophthalmic lenses, for example, silicone hydrogel contact lenses, such as silicone hydrogel contact lenses with ophthalmically acceptable surface wettabilities.

The present molds may be provided so that the first and second mold members are structured to be snap fitted together or press fitted together or other forms of interference fitting together using one or more structural features on the first and/or second mold members to provide the interference fit.

In one embodiment, with the first and second mold members assembled together, a silicone hydrogel lens precursor composition is located in the lens-shaped cavity formed between the first and second mold members.

As used herein, the term "hydrogel" refers to a network or matrix of polymer chains, some or all of which may be water-soluble, and which may contain high percentages of water. Hydrogels refer to polymeric materials, including contact lenses, that are water swellable or water swelled. Thus, a hydrogel may be unhydrated and be water swellable, or a hydrogel may be partially hydrated and swollen with water, or a hydrogel may be fully hydrated and swollen with water. The term "silicone hydrogel" or "silicone hydrogel material" refers to a hydrogel that includes a silicon component or a silicone component. For example, a silicone hydrogel includes one or more hydrophilic silicon-containing polymers. A silicone hydrogel contact lens is a contact lens, including a vision correcting contact lens, that comprises a silicone hydrogel material.

A silicone-containing component is a component that contains at least one [—Si—O—Si] group, in a monomer, macromer or prepolymer. The Si and attached O may be present in the silicone-containing component in an amount greater than 20 weight percent, for example greater than 30 weight percent of the total molecular weight of the silicone-containing component. Useful silicone-containing components comprise polymerizable functional groups such as acrylate, methacrylate, acrylamide, methacrylamide, N-vinyl lactam, N-vinylamide, and styryl functional groups. Examples of some silicone-containing components which are useful in the present lenses may be found in U.S. Pat. Nos. 3,808,178; 4,120,570; 4,136,250; 4,153,641; 4,740,533; 5,034,461 and 5,070,215, and European Patent No. EP080539.

Further examples of suitable silicone-containing monomers are polysiloxanylalkyl(meth)acrylic monomers including, without limitation, methacryloxypropyl tris(trimethylsiloxy) silane, pentamethyldisiloxanyl methylmethacrylate, and methyldi(trimethylsiloxy)methacryloxymethyl silane.

One useful class of silicone-containing components is a poly(organosiloxane) prepolymer such as α, ω-bismethacryloxy-propyl polydimethylsiloxane. Another example is MPDMS (monomethacryloxypropyl terminated mono-n-butyl terminated polydimethylsiloxane). Another useful class of silicone containing components includes silicone-containing vinyl carbonate or vinyl carbamate monomers including, without limitation, 1,3-bis[4-(vinyloxycarbonyloxy)but-1-yl]tetramethylisiloxane 3-(vinyloxycarbonylthio) propyl-[tris (trimethylsiloxysilane]; 3-[tris(trimethylsiloxy)silyl] propyl allyl carbamate; 3-[tris(trimethylsiloxy)wilyl]propyl vinyl carbamate; trimethylsilylethyl vinyl carbonate; and trimethylsilylmethyl vinyl carbonate. An example of suitable materials include agents represented by the following formula:

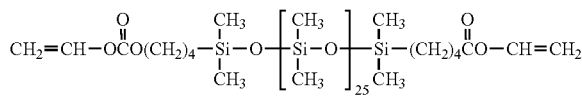

Another example of suitable materials include agents represented by the following formula:

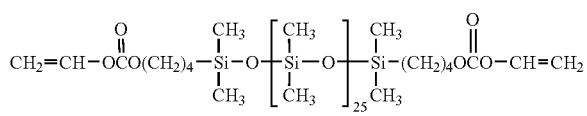

Another example of suitable materials include agents represented by the following formula, herein designated M3U:

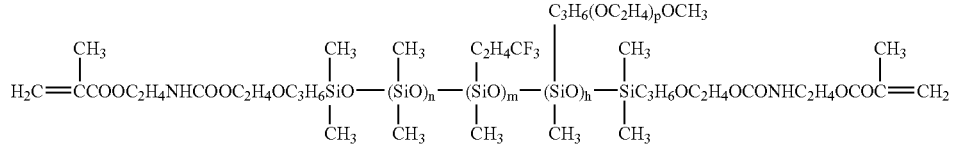

where n is 121, m is 7.6, h is 4.4, and the Mn=12,800, and the Mw=16,200. M3U can also be referred to as α-ω-Bis (methacryloyloxyethyl iminocarboxy ethyloxypropyl)-poly (dimethylsiloxane)-poly (trifluoropropylmethylsiloxane)-poly (ω-methoxy-poly(ethyleneglycol) propylmethylsiloxane); or a dimethacryloyl silicone-containing macromer.

Another example of suitable materials include agents represented by the following formula, herein designated FM0411M:

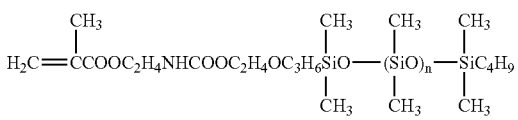

where n=13-16, and the Mw is 1500. FM0411M can also be referred to as FM-0411M; or a-Methacryloyloxyethyl iminocarboxyethyloxypropyl-poly(dimethylsiloxy)-butyldimethylsilane In addition to the silicon-containing component, the present lenses, lens products, and compositions may include one or more hydrophilic components. Hydrophilic components include those which are capable of providing at least about 20%, for example, at least about 25% water content to the resulting lens when combined with the remaining reactive components. Suitable hydrophilic components may be present in amounts between about 10 to about 60 weight % based upon the weight of all reactive components. About 15 to about 50 weight %, for example, between about 20 to about 40 weight %. Hydrophilic monomers that may be used to make the polymers for the present lenses have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents.

"Acrylic-type" or "acrylic-containing" monomers are those monomers containing the acrylic group (CR'H=CRCOX) wherein R is H or $CH_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the materials of the present lenses may include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester. In one embodiment, the hydrophilic vinyl-containing monomer is NVP.

Other hydrophilic monomers that can be employed in the present lenses include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Additional examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art. More preferred hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate. In certain embodiments, hydrophilic monomers including DMA, NVP and mixtures thereof are employed.

Additional examples of materials used to make silicone hydrogel contact lenses include those materials disclosed in U.S. Pat. No. 6,867,245.

Figure 2:
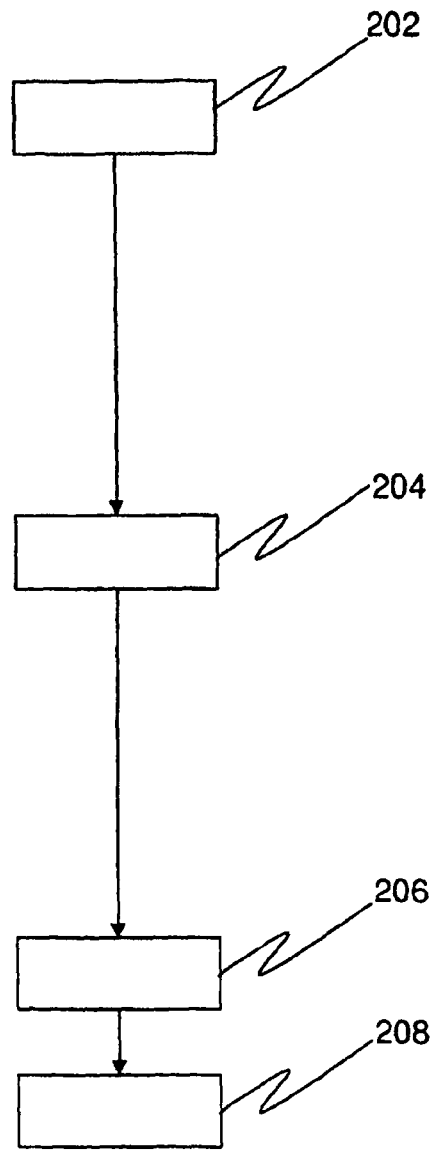
FIG. 2 is a flow chart illustrating certain precursor compositions, and lens products and contact lenses produced using such precursor compositions.

A method of contact lens, for example, silicone hydrogel contact lens, manufacture is illustrated in FIG. 1 and includes a step 102 of placing a lens precursor composition on or in a contact lens mold member. In reference to the present application, the lens precursor composition can be understood to be a polymerizable silicone hydrogel lens precursor composition 202, as shown in FIG. 2. The polymerizable silicone hydrogel lens precursor composition may be understood to be a pre-polymerized or pre-cured composition suitable for polymerization.

As used herein, the present polymerizable composition may also be referred to as a monomer mix. Preferably, the polymerizable composition or lens precursor composition is not polymerized before curing or polymerization of the composition. However, polymerizable compositions or lens precursor compositions may be partially polymerized before undergoing a curing process.

The present lens precursor compositions can be provided in containers, dispensing devices, or contact lens molds prior to a curing or polymerization procedure, as described herein. Referring back to FIG. 1, the lens precursor composition is placed on a lens forming surface of a female contact lens mold member. The female contact lens mold member may be understood to be a first contact lens mold member or an anterior contact lens mold member. For example, the female contact lens mold member has a lens forming surface that defines the anterior or front surface of a contact lens produced from the contact lens mold. The second contact lens mold member may be understood to be a male contact lens mold member or a posterior contact lens mold member. For example, the second contact lens mold member includes a lens forming surface that defines the posterior surface of a contact lens produced in the contact lens mold.

Further in reference to the present application, the first and second mold members include a major amount of a polar polymeric material, such as EVOH, and have been produced, in accordance with the present invention to have a flexural modulus of about 1710 MPa or about 770 MPa. The contact angle as measured by the captive bubble method of the first and second mold members is in a range of about 50° to about 65°. Various approaches to achieving polar mold members having flexural modulus of less than 3800 MPa or less than about 3000 MPa, are disclosed herein and illustrated in the non-limiting Examples included herein. Using any one of such approaches, the first and second mold members are structured to be interference fitted together and have sufficient degree of polarity to produce silicone hydrogel contact lenses having ophthalmically acceptable surface wettabilities.

Figure 3:
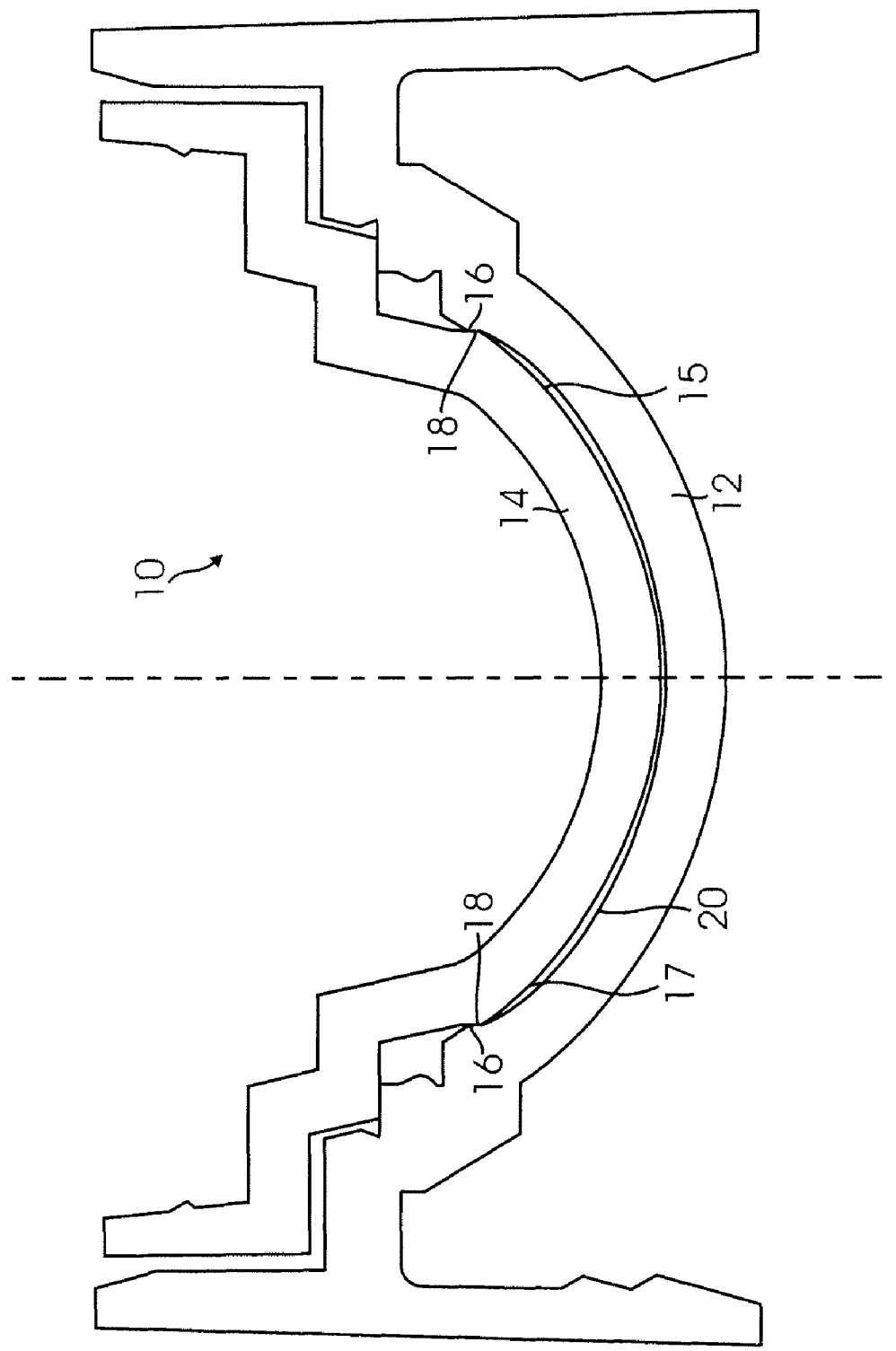
FIG. 3 is a cross-sectional view of an embodiment of a contact lens mold in accordance with the present invention.

Specifically, referring to FIG. 3, a contact lens mold in accordance with the present invention, shown generally at 10, includes a first or female mold member 12 coupled to a second or male mold member 14 to form a lens-shaped cavity 15 which has a circular periphery. In addition, the first and second mold members 12 and 14 are structured to produce a contact lens having a rounded posterior edge surface.

As shown in FIG. 3, lens-shaped cavity 15 contains silicone hydrogel precursor composition 17. The first and second mold members 12 and 14 are interference fitted together. In particular, first and second mold members 12 and 14 are press fitted together at first peripheral region 16 (of first mold member 12) and second pheripheral region 18 (of second mold member 14). Thus, first and second peripheral regions 16 and 18 are structured to be in direct, securing contact when the mold 10 is assembled as shown in FIG. 3. The first and second mold member 12 and 14 can be securely joined or coupled together simply by moving one or both of the mold members toward each other until the peripheral regions 16 and 18 come into direct, securing contact.

When it is desired to separate the first and second mold members 12 and 14, the mold members can be pulled apart or a tool can be used to overcome the direct, securing contact at the peripheral regions 16 and 18, preferably without causing substantial damage to at least one of the first and second mold members and to the ophthalmic lens product formed in the lens-shaped cavity. In any event, assembly and disassembly of the mold 10 in accordance with the present invention is easier, more consistent, quicker and less expensive than assembly/disassembly of a more rigid mold, for example, with mold members having a flexural modulus of at least 3800 MPa which can not be interference fitted together without damaging one or more of the mold members.

The first contact lens mold member 12 is placed in contact with a second contact lens mold member 14 to form a contact lens mold 10 having a contact lens-shaped cavity 15. Therefore, the method illustrated in FIG. 1 includes a step 104 of closing a contact lens mold 10 by placing two contact lens mold members 12, 14 in contact with each other to form a contact lens-shaped cavity 15. For example, with reference to FIG. 2, the polymerizable silicone hydrogel lens precursor composition 202 is located in the contact lens shaped cavity.

At step 106, the method illustrated in FIG. 1 includes curing the polymerizable silicone hydrogel lens precursor composition to form a pre-extracted polymerized silicone hydrogel contact lens product 204, as shown in FIG. 2. During curing, the lens forming components of the polymerizable silicone hydrogel lens precursor composition polymerize to form a polymerized lens product. Thus, the curing may also be understood to be a polymerizing step. The curing 106 can include exposing the polymerizable lens precursor composition to radiation effective in polymerizing the components of the lens precursor composition. For example, the curing 106 can include exposing the polymerizable lens precursor composition to polymerizing amounts of heat or ultraviolet (UV) light, among other things. The curing can also include curing the compositions in an oxygen-free environment. For example, the curing can occur in the presence of nitrogen or other inert gases.

The pre-extracted polymerized silicone hydrogel contact lens product 204 refers to a polymerized product prior to undergoing an extraction procedure that removes substantially all of an extractable component from the polymerized product. Pre-extracted polymerized silicone hydrogel contact lens products can be provided on or in contact lens molds, extraction trays, or other devices prior to being contacted by an extraction composition. For example, a pre-extracted polymerized silicone hydrogel contact lens product may be provided in a lens shaped cavity of a contact lens mold after a curing procedure, may be provided on or in one contact lens mold member after demolding of the contact lens mold, or may be provided on or in an extraction tray or other device after a delensing procedure and prior to an extraction procedure.

The pre-extracted polymerized silicone hydrogel contact lens product 204 includes a lens forming component, such as a silicon-containing polymeric network or matrix in the shape of a lens, and a removable component that can be removed from the lens forming component. The removable component can be understood to include unreacted monomers, oligomers, partially reacted monomers, or other agents which have not become covalently attached or otherwise immobilized relative to the lens-forming component. The removable component can also be understood to include one or more additives, including diluents, that can be extracted from the polymerized lens product during an extraction procedure, as discussed herein. Thus, materials of the removable component can include linear uncross-linked or slightly cross-linked or branched polymers of extractable materials that are not cross-linked to or otherwise immobilized relative to the polymer backbone, network, or matrix of the lens body.

After curing the polymerizable lens precursor compositions, the method illustrated in FIG. 1 includes a step 108 of demolding the contact lens mold. Demolding refers to the process of separating two mold members, such as male and female mold members 12 and 14 (FIG. 3), of a mold containing a pre-extracted polymerized contact lens product or polymerized device. The pre-extracted polymerized silicone hydrogel contact lens product is located on one of the demolded mold members. For example, the polymerized silicone hydrogel contact lens product may be located on the male mold member 14 or the female mold member 12.

The pre-extracted polymerized silicone hydrogel contact lens product 204 is then separated from the contact lens mold member on which it is located during delensing step 110, as shown in FIG. 1. The present first and second mold members 12 and 14 are structured to allow, at least facilitate, easy and consistent release of the lens product produced in the cavity 15 from one of the mold members, preferably from the second mold member 14, defining the posterior surface of the lens. The pre-extracted polymerized contact lens product can be delensed from the male mold member 14 or the female mold member 12, depending on which mold member the polymerized contact lens product remains adhered during the demolding of the contact lens mold.

After delensing the pre-extracted silicone hydrogel contact lens products, the method illustrated in FIG. 1 includes a step 112 of extracting extractable materials from the pre-extracted silicone hydrogel contact lens product. The extraction step 112 results in an extracted silicone hydrogel contact lens product 206, as shown in FIG. 2.

After extracting the pre-extracted polymerized silicone hydrogel contact lens products, the method includes a step 114 of hydrating the extracted polymerized silicone hydrogel contact lens products. The hydrating step 114 can include contacting an extracted polymerized silicone hydrogel contact lens product or one or more batches of such products with water or an aqueous solution to form a hydrated silicone hydrogel contact lens 208, as shown in FIG. 2.

After hydrating the extracted silicone hydrogel contact lens product to produce a silicone hydrogel contact lens, the method includes a step 116 of packaging the silicone hydrogel contact lens 208. For example, the silicone hydrogel contact lens 208 can be placed in a blister pack or other suitable container that includes a volume of a liquid, such as a saline solution, including buffered saline solutions. The blister pack or container can be sealed, and subsequently sterilized, as shown at step 118. For example, the packaged silicone hydrogel contact lens can be exposed to sterilizing amounts of radiation, including heat, such as by autoclaving, gamma radiation, e-beam radiation, and ultraviolet radiation.

In view of the disclosure herein, it can be understood that an embodiment of the present invention relates to a contact lens mold member that comprises a hydrophilic or polar resin. The contact lens mold member comprises a lens defining surface or optical quality surface having a contact angle less than 87° as determined by the captive bubble method. The contact lens mold member also has a flexural modulus less than 3800 MPa.

Another embodiment relates to a contact lens mold that comprises first and second mold members coupled together by an interference fit to form a lens shaped cavity. At least one, such as one or both, of the mold members comprises a hydrophilic or polar resin, and a lens defining surface having a contact angle less than 87° as determined by the captive bubble method, and having a flexural modulus less than 3800 MPa.

In certain embodiments, the mold member also comprises a plasticizer. In certain embodiments, the mold member comprises a semi-crystalline hydrophilic resin. In certain embodiments, the mold member comprises a lens defining surface having a contact angle less than 70° as determined by the captive bubble method. In further embodiments, the mold member comprises a lens defining surface having a contact angle from about 45° to about 67° as determined by the captive bubble method. In certain embodiments, the mold member comprises EVOH.

In at least one specific embodiment, the present mold members and molds comprising such mold members, comprise, consist essentially of, or consist entirely of an EVOH-based resin and the mold members or sections have a flexural modulus less than 3800 MPa. In certain embodiments, the mold members have a flexural modulus less than about 3000 MPa. The flexural modulus can be determined using the ISO 178 method, as understood by persons of ordinary skill in the art. In certain embodiments, the EVOH-based resin includes a plasticizer, including, without limitation, one or more water soluble plasticizers. In certain embodiments, the mold member comprises a lens defining surface having a contact angle from about 45° to about 67° as determined by the captive bubble method. In certain embodiments, the lens defining surface has a contact angle with water of from about 50° to about 55°.

The present EVOH-based mold members may also have desirable tensile moduli. For example, embodiments of the present mold member may have a tensile modulus less than 1170 MPa. In certain embodiments, the tensile modulus of the present mold member is from about 100 MPa to about 700 MPa. One example is an EVOH-based mold member having a tensile modulus of 220 MPa. Another example is an EVOH-based mold member having a tensile modulus of 580 MPa. The tensile modulus of the present mold members or mold member material can be determined using the ISO 527-2 method, as understood by persons of ordinary skill in the art.

The present invention also relates to methods of using the present mold members and molds to produce ophthalmic lenses, such as silicone hydrogel contact lenses.

For example, a method of producing a silicone hydrogel contact lens comprises placing a polymerizable silicone hydrogel lens precursor composition on a lens defining surface of a "female" version of the present mold members, placing a "male" version of the present mold members in contact with the female mold member to form an interference fit between the female and male mold members, and curing the contact lens mold containing the polymerizable composition to form a polymerized silicone hydrogel contact lens product. Methods can also include one or more steps of demolding the mold, delensing the lens product from the mold, extracting and hydrating the lens product to form a silicone hydrogel contact lens, and packaging and sterilizing the contact lens so produced.

The present mold members can be produced by conventional injection molding procedures known to persons of ordinary skill in the art. For example, a quantity of the resin material disclosed herein can be heated to form a molten thermoplastic material. The molten thermoplastic material can be dispensed into a mold cavity in the shape of an ophthalmic lens mold. For example, the mold cavity can include one or two optical quality molding surfaces. The optical quality molding surfaces can be provided as components of one or more removable inserts located in a plate or other housing, or can be integrally machined as part of the molding cavity. The molten thermoplastic material in the mold cavity can then be cooled and separated from the molding machine to be moved to a station to receive a volume of the polymerizable lens precursor composition.

The following non-limiting Examples illustrate certain aspects of the present invention.

EXAMPLE 1

Comparative

A quantity of SOARLITE S ethylene vinyl alcohol (EVOH) polymer is provided in granular or pellet form. This EVOH polymer has a flexural modulus of 3800 MPa determined using the ISO 178 method, and has an equivalent ethylene content of 38 mol %. By equivalent ethylene content is meant the mol percent of the EVOH polymer made of units obtained from ethylene.

A portion of these granules is processed by conventional injection molding into contact lens mold members, such as shown in FIG. 1.

When it is attempted to press fit the first mold member 12 to the second mold member 14 so as to provide a useful mold for producing a contact lens, it is determined that the two mold members cannot be press fit together. Additional processing, and the associated increased expense of such additional processing, is required in order to physically secure the two mold members together by point contact coupling so that a contact lens can be produced from the assembled mold.

EXAMPLE 2

Another portion of ethylene vinyl alcohol (EVOH) polymer granules is processed by conventional injection molding into contact lens mold members, as in Example 1. However, in this Example, the EVOH polymer is mixed with glyceryl monostearate, a plasticizer component in an amount to form a substantially uniform mixture so that the plasticizer component is about 20% by weight of the total composition which is subjected to injection molding. This molding material had a relatively low melting point.

EXAMPLE 3

An additional portion of ethylene vinyl alcohol (EVOH) polymer granules is processed by conventional injection molding into contact lens mold members, as in Example 1. However, in this Example, the EVOH polymer is mixed with ethylene vinyl acetate, a plasticizer component in an amount to form a substantially uniform mixture so that the plasticizer component is about 20% by weight of the total composition which is subjected to injection molding. The mold temperature was 140° C., the barrel temperature was 240° C., the hold time was 2.00 seconds, and the cooling time was 5.0 seconds. Acceptable contact lens molds are obtained having a flexural modulus less than 3800 MPa as determined using the ISO 178 method.

EXAMPLE 4

A further portion of ethylene vinyl alcohol (EVOH) polymer granules is processed by conventional injection molding into contact lens mold members, as in Example 1. However, in this Example, the molten EVOH polymer is mixed with ethylene vinyl acetate, a plasticizer component in an amount to form a substantially uniform mixture so that the plasticizer component is about 40% by weight of the total composition which is subjected to injection molding. The mold temperature was 140° C., the barrel temperature was 240° C., the hold time was 2.00 seconds, and the cooling time was 5.0 seconds. Acceptable contact lens molds are obtained having a flexural modulus less than 3800 MPa as determined using the ISO 178 method.

EXAMPLE 5

A quantity of a second ethylene vinyl alcohol (EVOH) polymer is produced using conventional processing and is provided in granular form. This second EVOH polymer has a flexural modulus of less than 3800 MPa, and has an equivalent ethylene content equal to 44 mol %.

A portion of these granules is processed by conventional injection molding into contact lens mold members, such as shown in FIG. 1.

When it is attempted to press fit the first mold member 12 to the second mold member 14 made of this EVOH polymer so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 6

Another portion of ethylene vinyl alcohol (EVOH) polymer granules is processed by conventional injection molding into contact lens mold members, as in Example 1. However, in this Example, the EVOH polymer is mixed with an acetic acid derivative, a plasticizer component in an amount to form a substantially uniform mixture so that the plasticizer component is about 10-15% by weight of the total composition which is subjected to injection molding. The flexural modulus of this composition is measured (ISO 178) and is less than 3800 MPa.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 7

An additional portion of ethylene vinyl alcohol (EVOH) polymer granules is processed by conventional injection molding into contact lens mold members, as in Example 1. However, in this Example, the EVOH polymer is mixed with adipic acid derivatives, a plasticizer component in an amount to form a substantially uniform mixture so that the plasticizer component is about 10-15% by weight of the total composition which is subjected to injection molding. The flexural modulus of this composition is measured (ISO 178) and is less than 3800 MPa.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 8

A further portion of ethylene vinyl alcohol (EVOH) polymer granules is processed by conventional injection molding into contact lens mold members, as in Example 1. However, in this Example, the EVOH polymer is mixed with azelaic acid derivatives, a plasticizer component in an amount to form a substantially uniform mixture so that the plasticizer component is about 10-15% by weight of the total composition which is subjected to injection molding. The flexural modulus of this composition is measured (ISO 178) and is less than 3800 MPa.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 9

Another portion of ethylene vinyl alcohol (EVOH) polymer is produced using conventional processing and is provided in granular form. However, in this Example, the EVOH polymer is mixed with a benzoic acid derivative, a plasticizer component in an amount to form a substantially uniform mixture so that the plasticizer component is about 15-25% by weight of the total composition which is subjected to injection molding. The flexural modulus of this composition is measured (ISO 178) and is less than 3800 MPa.

A portion of these granules is processed by conventional injection molding into contact lens mold members, such as shown in FIG. 1.

When it is attempted to press fit the first mold member 12 to the second mold member 14 made of this EVOH polymer so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 10

Another portion of ethylene vinyl alcohol (EVOH) polymer granules is processed by conventional injection molding into contact lens mold members as in Example 1. However, in this Example, the EVOH polymer is mixed with a citric acid derivative, a plasticizer component in an amount to form a substantially uniform mixture so that the plasticizer component is about 15-25% by weight of the total composition which is subjected to injection molding. The flexural modulus of this composition is measured (ISO 178) and is less than 3800 MPa.

When it is attempted to press fit the first mold member 12 to the second mold member 14 made of this EVOH/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 11

An additional portion of the ethylene vinyl alcohol (EVOH) polymer granules is processed by conventional injection molding into contact lens mold members, as in Example 1. However, in this Example, the EVOH polymer is mixed with a fumaric acid derivative, a plasticizer component in an amount to form a substantially uniform mixture so that the plasticizer component is about 10-20% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 12

A further portion of the ethylene vinyl alcohol (EVOH) polymer granules is processed by conventional injection molding into contact lens mold members, as in Example 1. However, in this Example, the EVOH polymer is mixed with a glutaric acid derivative, a plasticizer component in an amount to form a substantially uniform mixture so that the plasticizer component is about 10-20% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 13

A further portion of the ethylene vinyl alcohol (EVOH) polymer granules is processed by conventional injection molding into contact lens mold members, as in Example 1. However, in this Example, the EVOH polymer is mixed with a isobutyric acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

A portion of these granules is processed by conventional injection molding into contact lens mold members, such as shown in FIG. 1.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 14

Another portion of the ethylene vinyl alcohol (EVOH) polymer granules is processed by conventional injection molding into contact lens mold members, as in Example 1. However, in this Example, the EVOH polymer is mixed with an isophthalic acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 15

An additional portion of the ethylene vinyl alcohol (EVOH) polymer granules is processed by conventional injection molding into contact lens mold members, as in Example 1. However, in this Example, the EVOH polymer is mixed with a lauric acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 16

A further portion of the ethylene vinyl alcohol (EVOH) polymer granules is processed by conventional injection molding into contact lens mold members, as in Example 1. However, in this Example, the EVOH polymer is mixed with a phosphoric acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 17

A further portion of the ethylene vinyl alcohol (EVOH) polymer granules is processed by conventional injection molding into contact lens mold members, as in Example 1. However, in this Example, the EVOH polymer is mixed with a phthalic acid derivative, a plasticizer component in an amount to form a substantially uniform mixture so that the plasticizer component is about 10-15% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 18

A further portion of the ethylene vinyl alcohol (EVOH) polymer granules is processed by conventional injection molding into contact lens mold members, as in Example 1. However, in this Example, the EVOH polymer is mixed with a ricinoleic acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 19

A further portion of the ethylene vinyl alcohol (EVOH) polymer granules is processed by conventional injection molding into contact lens mold members, as in Example 1. However, in this Example, the EVOH polymer is mixed with a sebacic acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 20

A further portion of the ethylene vinyl alcohol (EVOH) polymer granules is processed by conventional injection molding into contact lens mold members, as in Example 1. However, in this Example, the EVOH polymer is mixed with a stearic acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 21

A further portion of the ethylene vinyl alcohol (EVOH) polymer granules is processed by conventional injection molding into contact lens mold members, as in Example 1. However, in this Example, the EVOH polymer is mixed with a sulfonic acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 22

A further portion of the ethylene vinyl alcohol (EVOH) polymer granules is processed by conventional injection molding into contact lens mold members, as in Example 1. However, in this Example, the EVOH polymer is mixed with a terephthalic acid derivative, a plasticizer component in an amount to form a substantially uniform mixture so that the plasticizer component is about 10-25% by weight of the total composition which is subjected to injection molding. The flexural modulus of this composition is measured (ISO 178) and a flexural modulus less than 3800 MPa is indicative of a useful mold.

When it is attempted to press fit the first mold member 12 to the second mold member 14 made of this EVOH polymer/plasticizer component mixture so as to provide a useful mold for producing a contact lens, it is determined that the two mold members can be press fit together, such as at annular regions 16 and 18 of first and second mold members 12 and 14, respectively. No further processing or expense is required to physically secure the two mold members together so that a contact lens can be produced from the assembled mold 10.

EXAMPLE 23

A portion of ethylene vinyl alcohol (EVOH) polymer granules is combined with granules of polypropylene (PP), for example, of a grade conventionally used to produce polypropylene (PP) contact lens molds. This substantially uniform mixture of granules includes 90 wt % EVOH polymer and 10 wt % PP.

A portion of this EVOH polymer/PP mixture is processed by conventional injection molding into contact lens mold members, such as shown in FIG. 1. The mixed EVOH/PP mold members have a flexural modulus of less than 3800 MPa.

When it is attempted to press fit the first mold member 12 to the second mold member 14 made of this EVOH polymer/PP mixture so as to provide a useful mold for producing a contact lens, it is determined that the two mold members can be press fit together, such as at annular regions 16 and 18 of first and second mold members 12 and 14, respectively.

No further processing or expense is required to physically secure the two mold members together so that a contact lens can be produced from the assembled mold 10.

EXAMPLES 24-46

Contact lens molds produced using the polar polymeric materials of examples 2-23 is used to produce a silicone hydrogel contact lens from a monomer mixture including a hydrophilic silicon-containing monomer component and a non-silicon-containing monomer component. The silicone hydrogel contact lenses so produced are free of a surface treatment and are free of a polymeric wetting agent IPN.

Each of the resulting lenses has an ophthalmically acceptable surface wettability, as determined by contact angle measurements and water BUTs. Such ophthalmically acceptable surface wettabilities are believed to be a benefit of the use of the polar molds in accordance with the present invention.

Combinations of two or more of (1) including plasticizer components; (2) alterations in polar polymer make-up or compositions, for example, changing equivalent ethylene content in EVOH polymers; and (3) including non-polar polymers with the polar polymer may be employed to provide lens molds which can be interference fitted together and provide satisfactory benefits to the lenses, such as ophthalmically acceptable surface wettability to silicone hydrogel contact lenses, produced using such molds.

While this invention has been described with respect to various specific examples and embodiments, it is to be understood that the invention is not limited thereto and that it can be variously practiced within the scope of the following claims.

What is claimed is:

1. A method of making a silicone hydrogel contact lens, comprising:
   curing a polymerizable silicone hydrogel lens precursor composition located in a lens shaped cavity of a mold comprising a first mold member and a second mold member sized and adapted to be assembled together to define the lens-shaped cavity therebetween, at least one of the first mold member and the second mold member comprising a mixture of a polar polymeric material and a different hydrophobic polymeric material and having a flexural modulus less than 3800 MPa.

2. The method of claim 1, wherein the at least one of the first mold member and the second mold member has a flexural modulus less than about 3000 MPa.

3. The method of claim 1, wherein both the first mold member and the second mold member comprise the mixture of the polar polymeric material and the different hydrophobic polymeric material.

4. The method of claim 1 wherein the at least one of the first mold member and the second mold member comprising the mixture further includes a plasticizer component in an amount effective to reduce the flexural modulus of the at least one of the first and second mold member relative to an identical at least one of the first and second mold member without the plasticizer component.

5. The method of claim 1, wherein the first and second mold members are assembled together.

6. The method of claim 5, further comprising the step of placing the polymerizable silicone hydrogel lens precursor composition in the lens shaped cavity.

7. The method of claim 1, wherein the first mold member and the second mold member are structured to produce an ophthalmic lens having a rounded posterior edge portion.

8. The method of claim 1, wherein the at least one of the first mold member and the second mold member has a contact angle less than 90° using the captive bubble method.

9. The method of claim 1, wherein the polar polymeric material comprises a hydrophilic polymer.

10. The method of claim 1, wherein the mixture comprises a mixture of ethylene vinyl alcohol and a non-polar polymer.

11. The method of claim 1, wherein the polar polymeric material comprises polyvinyl alcohol.

12. The method of claim 1, wherein the mixture comprises a mixture including polyvinyl alcohol and a non-hydrophilic polymer.

13. The method of claim 1, further comprising at least one step selected from the group consisting of:
   demolding the mold containing a polymerized silicone hydrogel contact lens product;
   delensing the polymerized silicone hydrogel contact lens product from one of the mold members of the mold;
   extracting an extractable component from the polymerized silicone hydrogel contact lens product to produce an extracted polymerized silicone hydrogel contact lens product;
   hydrating the extracted polymerized silicone hydrogel contact lens product to produce a hydrated silicone hydrogel contact lens;
   packaging the hydrated silicone hydrogel contact lens; and
   sterilizing the hydrated silicone hydrogel contact lens.

14. A method of making a silicone hydrogel contact lens, comprising:
   curing a polymerizable silicone hydrogel lens precursor composition in direct contact with a lens shaped cavity of a mold comprising a first mold member and a second mold member sized and adapted to be assembled together to define the lens-shaped cavity therebetween, at least one of the first mold member and the second mold member comprising a mixture of a polar polymeric material and a different hydrophobic polymeric material, and having a flexural modulus less than 3800MPa.

15. The method of claim 14, wherein the flexural modulus is less than about 3000MPa.

16. The method of claim 14, wherein the polar polymeric material further comprises a plasticizer component in an amount effective to reduce the flexural modulus of a mold body of the at least one of the first mold member and the second mold member relative to an identical mold body without the plasticizer component.

17. The method of claim 14, wherein the at least one of the first mold member and the second mold member is structured to be assembled with another mold member to define a lens-shaped cavity therebetween.

18. The method of claim 14, wherein the at least one of the first mold member and the second mold member is structured to produce an ophthalmic lens having a rounded posterior edge portion.

19. The method of claim 14, wherein the at least one of the first mold member and the second mold member has a lens defining surface having a contact angle less than 90° using the captive bubble method.

20. The method of claim 14, wherein the polar polymeric material comprises ethylene vinyl alcohol.

21. The method of claim 14, wherein the ethylene vinyl alcohol has an equivalent ethylene content greater than 38 mol %.

22. The method of claim 14, wherein the polar polymeric material comprises a hydrophilic polymer.

23. A method of making a silicone hydrogel contact lens, comprising:
   curing a polymerizable silicone hydrogel lens precursor composition in direct contact with a lens shaped cavity of a mold comprising a first mold member and a second mold member sized and adapted to be assembled together to define the lens-shaped cavity therebetween, at least one of the first mold member and the second mold member comprising a mixture including a hydrophilic polar polymer and a non-hydrophilic polymer, and having a flexural modulus less than 3800 MPa.

24. The method of claim 23, wherein the mixture comprises a mixture of ethylene vinyl alcohol and a non-polar polymer.

25. The method of claim 23, wherein the polar polymeric material comprises polyvinyl alcohol.

* * * * *